(12) United States Patent
von Gostomski et al.

(10) Patent No.: US 10,689,111 B2
(45) Date of Patent: Jun. 23, 2020

(54) STORAGE CONTAINER AND METHOD FOR HOLDING A CONSIGNMENT

(71) Applicant: Deutsche Post AG, Bonn (DE)

(72) Inventors: Markus von Gostomski, Bonn (DE); Florian Markert, Bonn (DE)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 16/027,882

(22) Filed: Jul. 5, 2018

(65) Prior Publication Data

US 2019/0009906 A1 Jan. 10, 2019

(30) Foreign Application Priority Data

Jul. 6, 2017 (DE) .......................... 10 2017 115 159

(51) Int. Cl.
| | | |
|---|---|---|
| *B64C 39/02* | (2006.01) | |
| *A47G 29/14* | (2006.01) | |
| *B64D 1/10* | (2006.01) | |
| *B64D 1/12* | (2006.01) | |
| B65G 11/12 | (2006.01) | |
| G06Q 10/08 | (2012.01) | |

(52) U.S. Cl.
CPC ............ *B64C 39/024* (2013.01); *A47G 29/14* (2013.01); *B64D 1/10* (2013.01); *B64D 1/12* (2013.01); *A47G 2200/226* (2013.01); *B64C 2201/128* (2013.01); *B64C 2201/141* (2013.01); *B65G 11/123* (2013.01); *G06Q 10/0832* (2013.01)

(58) Field of Classification Search
CPC ........ B64C 39/024; A47G 29/14; B64D 1/10; B64D 1/12; B64F 1/32; B65G 43/00
See application file for complete search history.

(56) References Cited

U.S. PATENT DOCUMENTS

| | | | |
|---|---|---|---|
| 9,387,928 B1 | 7/2016 | Gentry et al. | |
| 9,777,502 B2 * | 10/2017 | Curlander | ............... E04H 14/00 |
| 9,811,796 B2 * | 11/2017 | Ogilvie | ..................... B64F 1/04 |

(Continued)

FOREIGN PATENT DOCUMENTS

| | | |
|---|---|---|
| DE | 9300126 U1 | 4/1993 |
| DE | 102007014239 A1 | 9/2008 |

(Continued)

OTHER PUBLICATIONS

Extended European Search Report EP18182107, dated Dec. 3, 2018. (21 pages).

(Continued)

*Primary Examiner* — Kaitlin S Joerger
(74) *Attorney, Agent, or Firm* — Dority & Manning, P.A.

(57) ABSTRACT

A receiving container for keeping a consignment transferred to the receiving container by an unmanned flyable transporting device includes a slide extending between a beginning of the slide and an end of the slide and a plurality of receiving compartments, provided in the region of the end of the slide, for receiving the consignment. The slide is one or more of rotatable about the vertical, pivotable about the horizontal and adjustable in length between the beginning of the slide and the end of the slide in order to deliver the consignment obtained from the transporting device at the beginning of the slide into one of the plurality of receiving compartments at the end of the slide.

14 Claims, 2 Drawing Sheets

(56) References Cited

U.S. PATENT DOCUMENTS

| | | | |
|---|---|---|---|
| 10,287,034 B2* | 5/2019 | Mozer | B64F 1/36 |
| 2015/0120094 A1 | 4/2015 | Kimchi et al. | |
| 2016/0140496 A1 | 5/2016 | Simms et al. | |

FOREIGN PATENT DOCUMENTS

| | | |
|---|---|---|
| DE | 102009039034 A1 | 9/2010 |
| DE | 102014206534 A1 | 10/2015 |
| DE | 102014112480 A1 | 3/2016 |
| WO | WO 2017/058924 A1 | 4/2017 |

OTHER PUBLICATIONS

German Office Action and Search Report DE102017115159.1, dated Apr. 26, 2018. (11 pages).
German Search Report DE102017115159.1, dated Apr. 26, 2018. (5 pages).
German Search Report—English Translation DE102017115159.1, dated Apr. 26, 2018. (2 pages).

* cited by examiner

STORAGE CONTAINER AND METHOD FOR HOLDING A CONSIGNMENT

TECHNICAL FIELD

The invention relates generally to a receiving container for keeping an assignment transferred to the receiving container by an unmanned flyable transporting device. The invention also relates to a method for keeping the consignment transferred to the receiving container by the unmanned flyable transporting device.

BACKGROUND OF THE INVENTION

As a result of increasing transportation of goods by single-item and consolidated-freight journeys, transporting operations by truck or container, ocean-cargo or air-freight package transporting operations in the area of e-commerce and online mail-order business, the number of transported goods, and in particular parcel deliveries and consignments, has increased. Although it is possible nowadays to place an order online independently of conventional store opening times, the delivery of the consignment to the recipient almost always takes place by traditional delivery methods, for example by postmen, or in the case of parcel deliveries by motorized delivery vehicles, but essentially only within store opening times. If the recipient cannot be found when the delivery is made, for example because, as a person who has a job, he or she is at work during store opening times, it is attempted to deliver the consignment at another time or the consignment is left at a branch of the delivery company to be picked up by the recipient. Although there has for some time been the possibility of leaving consignments at a holding point, for example at a DHL Packstation, such holding points are not yet universally available, and consequently are not an alternative in every case.

Therefore, recently attempts have been made to deliver consignments to the recipient or the holding point by unmanned flyable transporting devices, for example by an unmanned flying device also known as a parcelcopter or drone. Regularly used in these attempts is a receiving container for receiving and keeping the consignment, to which the transporting device can transfer the consignment or from which the transporting device can pick up the consignment. Once the consignment has been transferred by the transporting device to the receiving container, which is for example installed in a front yard or on a roof of a house of the recipient or, for a municipality, is provided for a plurality of recipients, the consignment can also be removed from the receiving container outside store opening times.

In the aforementioned attempts, the actual transfer of the consignment from the transporting device to the receiving container has proven to be particularly difficult. For example, "dropping" the consignment from the transporting device onto the receiving container is not possible, in order not to damage fragile consignments.

DESCRIPTION OF THE INVENTION

On the basis of the above described situation, an object of the present invention is to transfer a consignment in a reliable way between an unmanned flyable transporting device and a receiving container, so that the consignment may be easily brought into an area where it is available to a recipient of the consignment.

Accordingly, the object is achieved by a receiving container for keeping a consignment transported to the receiving container by an unmanned flyable transporting device, with a slide extending between a beginning of the slide and an end of the slide and a plurality of receiving compartments, provided in the region of the end of the slide, for receiving at least one consignment, the slide being designed as rotatable about the vertical, pivotable about the horizontal and/or adjustable in length between the beginning of the slide and the end of the slide, in order to deliver a consignment obtained from the transporting device at the beginning of the slide into one of the receiving compartments at the end of the slide.

An essential aspect of the invention is the slide, which is preferably arranged within the receiving container, so that a consignment transferred from the unmanned flyable transporting device to the receiving container is delieverable in a particularly easy way into one of the number of receiving compartments by gravitational force. Since the slide is designed as rotatable about the vertical, pivotable about the horizontal and/or adjustable in length between the beginning of the slide and the end of the slide, the consignment is deliverable in a flexible way into various receiving compartments and in particular in dependence on the consignment into a predetermined receiving compartment.

While receiving compartments that are arranged next to one another may be reached by rotating the slide about the vertical, receiving compartments that are arranged one above the other may be reached by pivoting the slide about the horizontal, if appropriate by adjusting the length of the slide. The slide is preferably mounted rotatably about the vertical and/or pivotably about the horizontal at the end of the slide on the receiving container, for example by a rotary joint. For rotating, pivoting and/or adjusting the length of the slide, an electromechanical device is preferably provided, by which the slide is rotatable, pivotable and/or adjustable in length in such a way that the consignment obtained from the transporting device may be delivered into a predetermined receiving compartment.

The slide, often also known as a slideway, may be designed for this purpose as desired, for example as an inclined plane of a smooth material, so that the consignment may move of its own accord in the direction of the end of the slide and on into one of the receiving compartments as a result of low friction and by gravitational force, in particular without any further force being expended. The slide preferably has at its edges between the beginning of the slide and the end of the slide guiding devices, for example in the form of lateral flanges, for guiding the consignment, so that the consignment cannot fall from the slide during sliding. The slide is preferably designed as a parcel slide and extends linearly between the beginning of the slide and the end of the slide, other designs similarly also being conceivable. The slide is preferably designed as a box slide with a straight bottom and two upright side pieces, as a half-shell slide with an open trough or as a tunnel slide with a closed tube.

The receiving compartments are preferably designed with a square section and/or in the so-called PKA format. The term "in the region of the end of the slide" means in particular that the end of the slide may be arranged adjacent to the receiving compartment, in particular by adjusting the length of the slide, in such a way that a consignment sliding down the slide may enter the receiving compartment from the end of the slide as a result of gravitational force alone.

The transporting device is preferably designed as a flying device, as an unmanned aircraft, as an "unmanned, uninhabited or unpiloted aerial vehicle", abbreviated UAV, as a parcelcopter or as a drone. Possible embodiments of the transporting device may be a helicopter, multicopter, quadrokopter or tiltwing, to mention just a few possibilities. The transporting device and/or the receiving container preferably has mechanical and/or information technology devices, which enable the transporting device and/or the receiving container to perform a method described below, in particular to perform the method automatically and/or autonomously. The transporting device and/or the receiving container may have a microprocessor, a control device and/or a programmable controller, which have a software program for performing the method steps and/or communication devices for wire-bound and/or wireless communication between the transporting device and the receiving container.

The transporting device may be provided with a payload container for transporting the consignment, which may be opened in the region of and/or above the end of the slide, in order that the consignment may enter the slide at the beginning of the slide. The consignment is for example a postal delivery, a package, a registered item, a letter or some other transportable item. The receiving container may be designed as a postbox, parcel box, parcel/letter box, Packstation and/or so-called Skyport for being provided in a yard or on a roof of a housing. After delivery of the consignment, it preferably remains in the receiving compartment, for example until a recipient of the consignment removes it from the receiving compartment. In the case of a building, the vertical preferably extends in the direction of the normal to the roof or the garden of the building and the horizontal correspondingly extends perpendicularly thereto.

According to a preferred development, the slide is designed as rotatable about the vertical and pivotable about the horizontal, the slide is designed as pivotable about the horizontal and adjustable in length, the slide is designed as rotatable about the vertical and adjustable in length or the slide is designed as rotatable about the vertical, pivotable about the horizontal and adjustable in length. In such a way, consignments may be delivered into different receiving compartments that are arranged next to one another, one above the other and running around the slide. The control described above may rotate, pivot and/or adjust the length of the slide in such a way that the consignment is delivered into a corresponding and/or predetermined receiving compartment in accordance with its dimensions, sizes, sections, volumes and/or on the basis of a predetermination.

It is correspondingly provided according to another preferred development that the receiving compartments are provided on at least two levels one above the other, next to one another and/or running around the slide. For example, 16, 64 or 256 receiving compartments may be provided, provided on a number of levels, next to one another and running around the slide, in particular within the receiving container. Similarly, only receiving compartments lying opposite one another may be provided, enclosing the slide in the middle. There are also other variants, to provide as many receiving compartments as possible in accordance with prevailing conditions at an installation location of the receiving container. In principle, all of the receiving compartments may have the same dimensions, sizes, sections and/or volumes, but it is similarly possible for receiving compartments to have different dimensions, sizes, sections and/or volumes in accordance with different consignment sizes.

According to a preferred development, each receiving compartment has a closable removal opening, through which the consignment may be removed from the receiving compartment, and/or each receiving compartment has a closable loading opening facing the slide. For closing the respective opening, a door or a roller shutter may be provided. The removal opening is preferably arranged facing away from the slide and/or opposite from the loading opening, so that a recipient of the consignment may remove it from the receiving compartment and/or position it after opening the unloading opening.

With the control described above, an opening of the loading opening may be initiated before delivery of the consignment and a closing may be initiated after delivery, in order that the consignment is protected from ambient influences and/or removal by unauthorized persons. For opening the removal opening, a key-operated switch of a mechanical or electronic design may be provided on the receiving container. In the case of an electronic key-operated switch, the opening may take place for example by an app provided on a smart phone of the recipient and/or a near-field communication link, such as for example NFC, which is in communication connection with the receiving container. The control provided in the receiving container is preferably designed to communicate with the smartphone of the recipient, for example by way of a wireless communication link on the basis of a mobile radio protocol or a local network.

In principle, the delivery of the consignment may take place as described above directly from the end of the slide into the receiving compartment. According to a preferred development, each receiving compartment has a positioning aid for delivering the consignment into the receiving compartment and/or for supporting the end of the slide. The positioning aid is preferably designed as a positioning plate, in particular as an inclined metal sheet, and is arranged on the receiving compartment, as seen from the slide, before the loading opening. The positioning aid is in particular connected rigidly to the receiving compartment and may ensure that the consignment may enter the receiving compartment completely and without further action.

In a preferred development, a landing platform provided above the beginning of the slide is provided for the transporting device and/or a funnel arranged between the landing platform and the beginning of the slide is provided. The landing platform and/or the funnel are preferably arranged above the slide and/or the beginning of the slide in the direction of the vertical. The landing platform may have a diameter of 1 m, 2 m, 3 m or more, a longitudinal and/or transverse guide being provided in order to position the transporting device that has landed on the landing platform centrally over the funnel. In this position, the consignment may be released from the transporting device and go onto the slide through the funnel at the beginning of the slide, in order to reach the receiving compartment after sliding down on the slide.

As described above, there are in principle various possibilities for the physical design of the receiving container. According to a preferred development, the receiving container has an openable roof, which is provided above the slide and the receiving compartments. The roof may be bounded by a perimeter guard running around it, so that, with the roof closed and bounded by the perimeter guard and the receiving compartments, the slide is provided completely within the receiving container, and is consequently protected from possibly harmful environmental influences. The roof may for example be designed such that it may be swung open and closed and be hinge-mounted on the perimeter guard.

To prevent an unauthorized person from approaching the transporting device that has landed or is flying up to it, an access restricting device, in particular of an electronic form, may be provided, by which going onto the roof and/or a roof of a building on which the receiving container is installed can be prevented. Said access restriction may on the one hand prevent access to the roof of the receiving container and on the other hand, in the case of a receiving container installed on a roof of a building, prevent access to the roof of the building. Such an access restriction may be designed as a turnstile, a barrier or the like.

To check whether a receiving compartment is already occupied by a consignment, in particular whether a consignment has already been delivered into a receiving compartment or has been removed from the receiving compartment by a recipient of the consignment, in an advantageous development an occupancy sensor, which is designed for example as a load sensor or the like, is provided. Preferably, each individual receiving compartment is provided with such a load sensor.

According to another preferred development, the receiving container has a transfer device, which is designed in particular to transfer a consignment from the receiving compartment to a transporting device that has landed on the receiving container. Similarly, the transfer device may be designed to remove a consignment from a transporting device that has landed on the receiving container and place it on the beginning of the slide. The transfer device may be designed in the manner of an arm of a crane or the like and is preferably arranged within the receiving container in the region of the slide.

The object of the invention is also achieved by a method for keeping a consignment that has been transferred to a receiving container by an unmanned flyable transporting device, the receiving container having a slide that is adjustable in length between a beginning of the slide and an end of the slide and a plurality of receiving compartments for receiving at least one consignment that are provided in the region of the end of the slide, comprising the step of: rotating the slide about the vertical, pivoting the slide about the horizontal and/or adjusting the length of the slide, in order to deliver a consignment obtained from the transporting device at the beginning of the slide into a predetermined receiving compartment of the receiving container at the end of the slide.

The proposed method makes it possible in a particularly easy and reliable way to deliver a consignment from a transporting device that has in particular landed on the receiving container into a predetermined receiving compartment of the receiving container. A recipient of the consignment may then remove it from the receiving compartment in a further step. The rotatable, pivotable and/or length-adjustable slide allows the consignment to be delivered into one of the number of receiving compartments. For lengthening the slide, it has for example a telescopic arm, so that a sliding path between the beginning of the slide and the end of the slide may be lengthened and/or may be shortened.

According to a preferred development, the method comprises the step of announcing a landing approach of the transporting device to the receiving container, checking whether the receiving container has a free receiving compartment for delivering the consignment, opening a roof of the receiving container for the landing of the transporting device on the receiving container and/or opening a loading opening of the predetermined receiving compartment and/or positioning the end of the slide in front of the predetermined receiving compartment. A transporting device approaching the receiving container may announce its position and/or the designated landing to the receiving container for example by a mobile radio protocol, such as for example LTE, or by connecting to a wireless network of the receiving container. If the receiving container does not have a free receiving compartment, an announcement may take place from the receiving container to the transporting device, so that the transporting device interrupts the landing approach and attempts to deliver the consignment to the receiving container once again at a later time.

If the receiving container has a free receiving compartment, which is in particular suitable with regard to size and/or volume for receiving the consignment, the roof of the receiving compartment may be opened, so that the transporting device may land on the receiving container. Once a loading opening of the predetermined receiving compartment or the receiving compartment selected by a control of the receiving container has been opened and once the end of the slide has been positioned in front of the predetermined receiving compartment by rotating, pivoting and/or adjusting the length of the slide, the consignment may be delivered by the transporting device into the receiving compartment by way of the slide, for example by releasing the consignment from the transporting device, so that the consignment slides down the slide into the receiving compartment.

According to another preferred development, the method comprises the step of sensing a change in weight of the predetermined receiving compartment, in particular after delivery of the consignment, announcing the delivery to a recipient of the consignment, and/or checking whether the transporting device has removed itself from the receiving container after the delivery of the consignment, and if so closing a roof of the receiving container. By sensing the change in weight for example by a load sensor, it may be established whether the delivery of the consignment has taken place, the receiving compartment is occupied and/or a weight of the consignment may be established. The announcement of the delivery to the recipient of the consignment preferably takes place by an electronic message from the receiving container, for example to a smartphone of the recipient. The recipient may then go to the receiving container in order to remove the consignment from the predetermined receiving compartment, if appropriate after authorization with respect to the receiving container. The removal of the consignment brings about a change in weight of the receiving compartment, which is then available for the delivery of another consignment.

According to yet another preferred development, the method comprises the step of checking whether a consignment has been delivered into the receiving compartment for a recipient, if so granting access for the recipient to a local area around the receiving container, and opening a removal opening of the receiving compartment. For example, the receiving container may be provided on a roof of a building, at the access door of which the recipient may authenticate himself/herself to go onto the roof. After checking has taken place, in particular when a consignment has been delivered to a receiving compartment for the recipient, the recipient may be granted access to the roof, for example by a turnstile, and a removal opening of the receiving compartment concerned may be opened. It may be ensured by the turnstile that only one recipient at a time is present on the roof as the local area around the receiving container.

Further embodiments and advantages of the invention are provided for a person skilled in the art by analogy with the receiving container described above.

BRIEF DESCRIPTION OF THE DRAWINGS

The invention is explained in more detail below with reference to the accompanying drawings on the basis of a preferred exemplary embodiment.

In the drawings.

DETAILED DESCRIPTION OF THE EXEMPLARY EMBODIMENT

Figure 1:
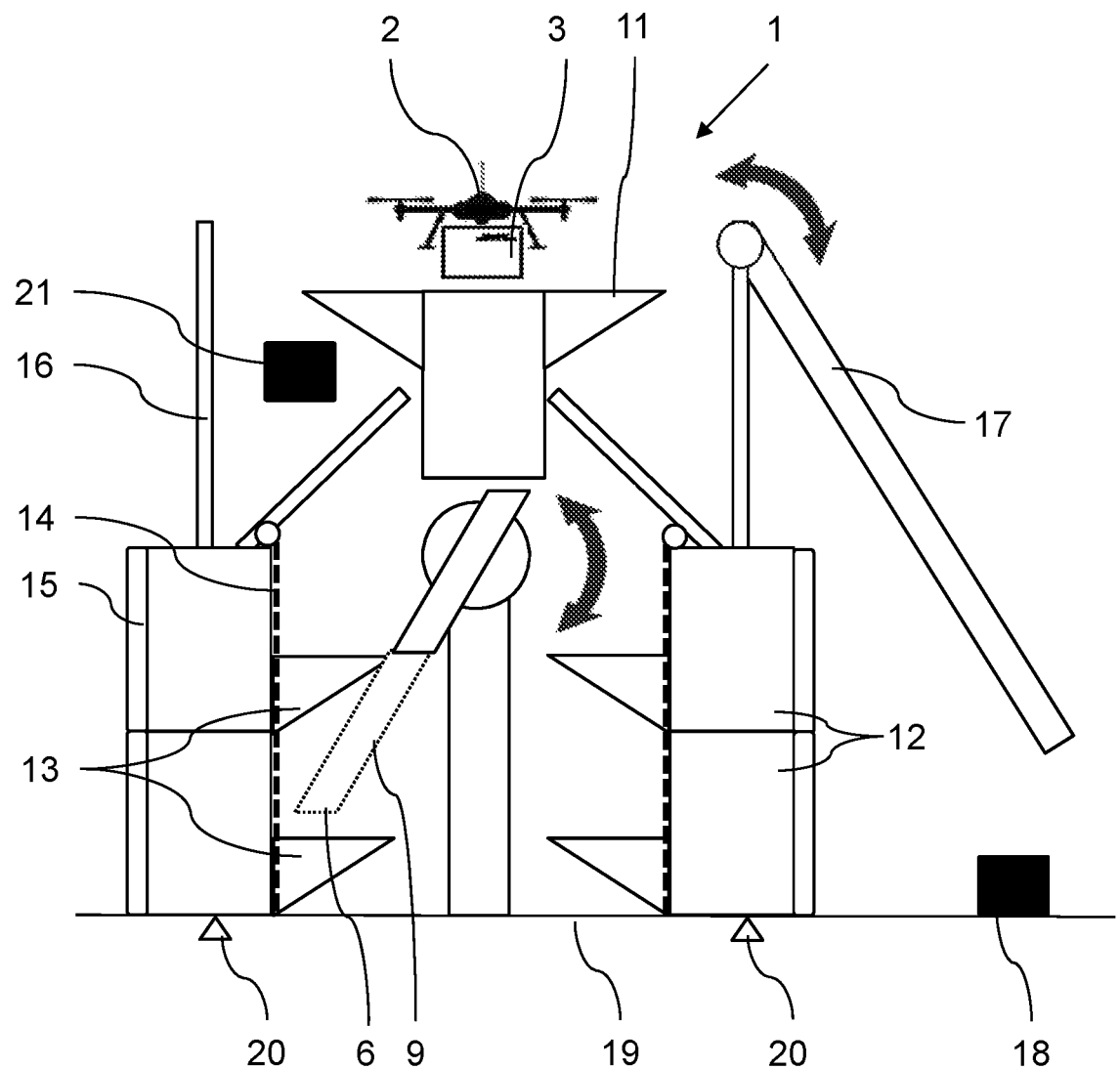
FIG. 1 shows a schematic view of a receiving container for carrying out a method according to a preferred exemplary embodiment of the invention in a schematic side view.
Figure 2:
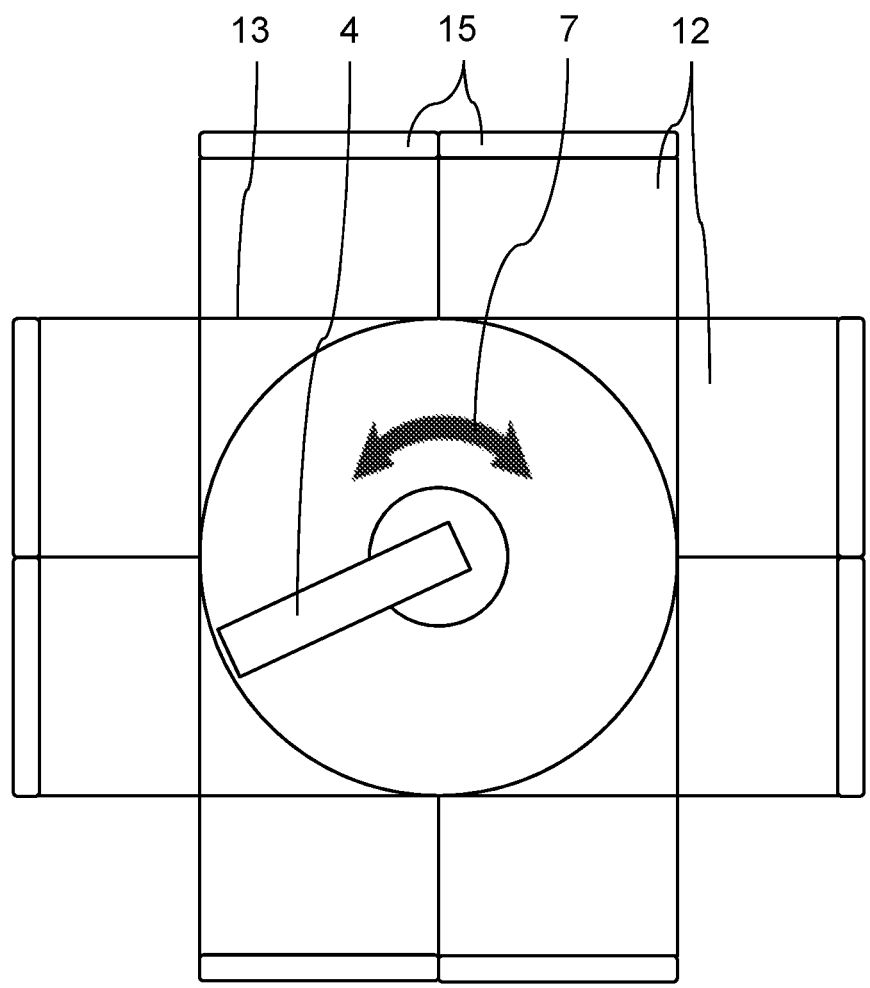
FIG. 2 shows the receiving container according to FIG. 1 in a schematic plan view.

FIG. 1 shows a receiving container 1 for keeping a consignment 3 transferred by an unmanned flyable transporting device 2 to the receiving container 1 for carrying out a corresponding method according to a preferred exemplary embodiment in a schematic side view and in FIG. 2 in a schematic plan view.

The receiving container 1 has a slide 4, which in the manner of a box slide extends linearly between a beginning of the slide 5 and an end of the slide 6. The slide 4 is designed as rotatable about the vertical, indicated in FIG. 2 by arrow 7, pivotable about the horizontal, indicated in FIG. 1 by arrow 8, and adjustable in length between the beginning of the slide 5 and the end of the slide 6 by a telescopic arm 9, at the beginning of the slide 5 on the receiving container 1.

Above the end of the slide 6, arranged in the receiving container 1 is a funnel 10, on the upper side of which a landing platform 11 is formed, on which the transporting device 2 may land on the receiving container 1, as also shown in FIG. 1. As may be seen from the plan view in FIG. 2, a number of receiving compartments 12 are arranged running around the slide 4, two receiving compartments 12 being respectively provided on each side, next to one another and one above the other.

The slide 4 is dimensioned in such a way that the end of the slide 6 may enter the region of each receiving compartment 12, that is to say for example reaches up to touch each receiving compartment 12. If, as shown in FIG. 1, a lower receiving compartment 12 is to be reached, a sliding path of the slide 4 is correspondingly lengthened by extending the telescopic arm 9, whereas, if an upper receiving compartment 12 is to be reached, not shown, the sliding path is shortened by retracting the telescopic arm 9 and the slide is also pivoted upwards with respect to the horizontal by its end of the slide 6. In this way, once the transporting device 2 has landed on the landing platform 11, the consignment 3 transferred by the transporting device 2 to the receiving container 1 may be delivered through the funnel 10 into one of the receiving compartments 12 by way of the slide 4.

To make delivery easier, provided on the underside of each receiving compartment 12 is a positioning aid 13 in the form of a metal sheet, which is inclined with respect to the receiving compartment 12 and fastened on it and on which the end of the slide 6 may be supported. Furthermore, each receiving compartment 12 has a loading opening 14, which is facing the slide 4 and may be closed by a rolling shutter. In an analogous way, on the side of the receiving compartment 12 opposite from the loading opening 14 a removal opening 15 is provided in the form of a parcel compartment door, through which a recipient of the consignment 3 may remove it from the receiving compartment 12.

Above the receiving compartments 12 arranged one above the other, a perimeter guard 16 which may be closed by a roof 17 that may be swung open is provided running around it. In the closed state, the funnel 10 and the slide 4 are provided within the receiving container 1, and consequently are protected from weather conditions. Moreover, an access restricting device 18 for the roof 17 of the receiving container 1 is provided in the form of a turnstile, only schematically represented, which alternatively or in addition also prevents access to a roof of a building 19, on which the receiving container 1 is installed, by which a transporting device 2 that has landed on the receiving container 1 or is on an approach flight to the receiving container 1 prevents anyone from going onto the roof 17 and/or the roof of the building 19.

Furthermore, each receiving compartment 12 is provided with an occupancy sensor 20 in the form of a balance, so that it may be checked whether a consignment 3 has been delivered in the receiving compartment 12. Finally, the receiving container 1 also has an only schematically represented transfer device 21 in the form of a robot arm, in order to transfer a consignment 3 from the receiving compartment 12 to a transporting device 2 that has landed on the receiving container 1.

According to a method that is given by way of example, the transporting device 2 on a landing approach announces a planned landing to the receiving container 1. The receiving container 1 then checks whether a free receiving compartment 12 is available for delivery of the consignment 3. If so, the roof 17 of the receiving container 1 is opened for the landing of the transporting device 2 on the receiving container 1. The loading opening 14 of a receiving compartment 12 predetermined by a control of the receiving container 1 is opened and the end of the slide 6 is positioned in front of the predetermined receiving compartment 12 by pivoting, rotating and/or adjusting the length of the slide 4. As a consequence, the consignment 3 may slide from the transporting device 2 into the receiving compartment 12 by way of the slide 4.

The delivery of the consignment 3 is detected by a change in weight of the predetermined receiving compartment 12 and is announced to a recipient of the consignment 3. Once the transporting device 2 has removed itself from the receiving container 1, the roof 17 of the receiving container 1 is closed again. The recipient may then be granted access to a local area surrounding the receiving container 1 and the removal opening 15 of the receiving compartment 12 may be opened, so that the recipient may take possession of the consignment.

The exemplary embodiments described are only examples, which can be modified and/or supplemented in various ways within the scope of the claims. Each feature that has been described for a specific exemplary embodiment can be used independently or in combination with other features in any desired other exemplary embodiment. Each feature that has been described for an exemplary embodiment of a particular category can also be used in a corresponding way in an exemplary embodiment of another category.

LIST OF DESIGNATIONS

Receiving container 1
Transporting device 2
Consignment 3
Slide 4
Beginning of the slide 5
End of the slide 6
Arrow 7
Arrow 8
Telescopic arm 9
Funnel 10

Landing platform 11
Receiving compartment 12
Positioning aid 13
Loading opening 14
Removal opening 15
Perimeter guard 16
Roof 17
Access restricting device 18
Roof of a building 19
Occupancy sensor 20
Transfer device 21

The invention claimed is:

1. A receiving container for keeping a consignment transferred to the receiving container by an unmanned flyable transporting device, comprising:
    a slide extending between a beginning of the slide and an end of the slide; and
    a plurality of receiving compartments provided in the region of the end of the slide, the plurality of receiving compartments configured for receiving at least one consignment;
    an access restricting device for a roof of the receiving container and/or a roof of a building on which the receiving container is installed, the access restricting device configured to block access onto the roof of the receiving container and/or the roof of the building when the transporting device is on the receiving container or is on an approach flight to the receiving container,
    wherein the slide is one or more of rotatable about the vertical, pivotable about the horizontal and adjustable in length between the beginning of the slide and the end of the slide in order to deliver the consignment obtained from the transporting device at the beginning of the slide into one of the plurality of receiving compartments at the end of the slide.

2. The receiving container of claim 1, wherein the slide is:
    rotatable about the vertical and pivotable about the horizontal;
    pivotable about the horizontal and adjustable in length;
    rotatable about the vertical and adjustable in length; or
    rotatable about the vertical, pivotable about the horizontal and adjustable in length.

3. The receiving container of claim 1, wherein the plurality of receiving compartments is distributed in at least two levels, the at least two levels positioned one of one above the other, next to one another and/or around the slide.

4. The receiving container of claim 1, wherein each receiving compartment of the plurality of receiving compartments has a closable removal opening through which the consignment is removable, a closable loading opening facing the slide, or both the closable removal opening and the closable loading opening.

5. The receiving container of claim 1, wherein each receiving compartment of the plurality of receiving compartments has a positioning aid for delivering the consignment into a respective receiving compartment and/or for supporting the end of the slide.

6. The receiving container of claim 1, further comprising a landing platform for the transporting device positioned above the beginning of the slide.

7. The receiving container of claim 6, further comprising a funnel positioned between the landing platform and the beginning of the slide.

8. The receiving container of claim 1, further comprising an openable roof provided above the slide and the plurality of receiving compartments.

9. The receiving container of claim 1, further comprising an occupancy sensor (20) configured for determining whether the consignment has been delivered in one of the plurality of receiving compartments.

10. The receiving container of claim 1, further comprising a transfer device configured to transfer the consignment from one of the plurality of receiving compartments to the transporting device when the transporting device has landed on the receiving container.

11. A method for keeping a consignment that has been transferred to a receiving container by an unmanned flyable transporting device, the receiving container having a slide that is adjustable in length between a beginning of the slide and an end of the slide and a plurality of receiving compartments for receiving the consignment, the plurality of receiving compartments provided in the region of the end of the slide, the method comprising:
    one or more of rotating the slide about the vertical, pivoting the slide about the horizontal and adjusting the length of the slide in order to deliver the consignment obtained from the transporting device at the beginning of the slide into one of the plurality of receiving compartments of the receiving container at the end of the slide,
    wherein the receiving container comprises an access restricting device for a roof of the receiving container and/or a roof of a building on which the receiving container is installed, the access restricting device configured to block access onto the roof of the receiving container and/or the roof of the building when the transporting device is on the receiving container or is on an approach flight to the receiving container.

12. The method of claim 11, further comprising:
    announcing a landing approach of the transporting device to the receiving container;
    checking whether the receiving container has a free receiving compartment for delivering the consignment;
    opening the roof of the receiving container for the landing of the transporting device on the receiving container; and
    opening a loading opening of a predetermined receiving compartment of the plurality of receiving compartments and/or positioning the end of the slide in front of the predetermined receiving compartment.

13. The method of claim 11, further comprising one or more of:
    sensing a change in weight of a predetermined receiving compartment of the plurality of receiving compartments after delivery of the consignment;
    announcing the delivery to a recipient of the consignment; and
    closing the roof of the receiving container in response to the transporting device leaving the receiving container after the delivery of the consignment.

14. The method of claim 11, further comprising:
    granting access to a recipient of the consignment into a local area around the receiving container in response to the consignment being delivered into one of the plurality of receiving compartments; and
    opening a removal opening of the one of the plurality of receiving compartments.

* * * * *